(12) United States Patent
Kieselbach et al.

(10) Patent No.: US 8,650,254 B2
(45) Date of Patent: Feb. 11, 2014

(54) PROVIDING VERSION CONTROL FOR ELECTRONIC MAIL ATTACHMENTS

(75) Inventors: Oliver Kieselbach, Hoevelhof (DE); Niklas Heidloff, Salzkotten (DE); Michael R. O'Brien, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 11/314,472

(22) Filed: Dec. 21, 2005

(65) Prior Publication Data

US 2007/0143425 A1 Jun. 21, 2007

(51) Int. Cl.
*G06F 15/16* (2006.01)
(52) U.S. Cl.
USPC ............ 709/206; 709/203; 709/204; 709/205; 709/207
(58) Field of Classification Search
None
See application file for complete search history.

(56) References Cited

U.S. PATENT DOCUMENTS

| | | | | |
|---|---|---|---|---|
| 6,915,333 | B2 * | 7/2005 | Delia et al. | 709/206 |
| 6,918,082 | B1 * | 7/2005 | Gross et al. | 715/206 |
| 7,003,551 | B2 * | 2/2006 | Malik | 709/206 |
| 7,080,123 | B2 * | 7/2006 | Freed | 709/206 |
| 7,089,287 | B2 * | 8/2006 | Bellotti et al. | 709/206 |
| 7,644,128 | B2 * | 1/2010 | Aaron et al. | 709/206 |
| 2003/0135565 | A1 * | 7/2003 | Estrada | 709/206 |
| 2003/0135659 | A1 | 7/2003 | Bellotti et al. | |
| 2003/0182323 | A1 | 9/2003 | Demsky et al. | |
| 2004/0064733 | A1 | 4/2004 | Gong | |
| 2004/0255247 | A1 | 12/2004 | Demsky et al. | |
| 2005/0193074 | A1 * | 9/2005 | Garland | 709/206 |
| 2005/0223061 | A1 * | 10/2005 | Auerbach et al. | 709/206 |

FOREIGN PATENT DOCUMENTS

| | | |
|---|---|---|
| JP | 09-237211 A | 9/1997 |
| JP | 2001-092734 A | 4/2001 |
| JP | 2001-142801 A | 5/2001 |

OTHER PUBLICATIONS

Bernauer et al., Traceable Document Flows, 15th International Workshop on Database and Expert Systems Applications 2004 (DEXA'04), 7 pages.

* cited by examiner

*Primary Examiner* — Thu Nguyen
*Assistant Examiner* — Angela Widhalm
(74) *Attorney, Agent, or Firm* — David A. Dagg (57) ABSTRACT

A system for providing version control for documents attached to electronic mail messages in which a user's personal document library is used to store documents attached to the email messages the user sends and/or receives. Each time an attached document is transmitted or received within a message thread, a different version of the document is created and stored in the personal document library. The multiple document versions created allow the disclosed system to provide the user with the options of opening the most recent version of an attached document and/or opening the version of the attached document that is associated with the specific opened message. An attached document is represented within an email message using a URL (Uniform Resource Locator), where the stored URL points to the version of the attached document for that message that is stored in the user's personal document library. Through an API (Application Programming Interface) provided by the personal document library, the most recent version of a document can be requested, or another specific version of the document can be indicated for opening.

5 Claims, 6 Drawing Sheets

FIG. 6

PROVIDING VERSION CONTROL FOR ELECTRONIC MAIL ATTACHMENTS

FIELD OF THE INVENTION

The present invention relates generally to handling of document attachments in electronic mail systems, and more specifically to a system and method for providing version control for documents attached to electronic mail messages.

BACKGROUND OF THE INVENTION

As it is generally known, electronic mail ("email") software systems transmit messages and associated document attachments between computer system users over a communication network. Email systems are often architected in a client-server software model, in which client software is provided in end user computer systems to enable users to compose, send and receive messages, while a server software component is provided to perform various centralized functions. In most email systems, messages can be received on behalf of a user by a server computer system for later retrieval. For example, an email client application program on a local computer system may operate by periodically querying an associated email server system to determine if one or more new messages have arrived for a local user. If so, then the email client can provide an alert to the local user indicating the arrival of the new message or messages. The local user can then download the received messages from the server system to the local client computer system. Email requires an underlying messaging system, which provides a store and forward capability, such as the Internet's Simple Mail Transfer Protocol (SMTP). Well known existing email client systems include Microsoft®'s Outlook and Eudora®. The Web browser program may also used to provide the mail client by way of an Internet email service, such as services provided by Google, Yahoo, and other Web portal providers.

Typical email applications provide a user with a graphical user interface through which messages can be composed and sent, and through which received and previously sent messages can be viewed. A number of mailbox constructs are usually maintained for the user, including an Inbox to store received messages, an Outbox into which messages are put pending being sent, and a Sent mailbox for storing messages that have previously been transmitted. An email message usually includes or is associated with one or more destination addresses or user names identifying recipients to which the message is to be delivered, sometimes known as a "To:" field. A "From:" field is also included or associated with a message, and identifies the sender of the message. A "Subject:" field for an email message includes a text string defining the subject of the message. A message body stores the content of the message, including text, images, links, or other content. A number of separate documents may also be attached to a message before it is sent, containing additional content to that contained-within the message body. After the message body, destination email addresses, and any attachments to the message are defined by the user, a "Send" graphical button or the like can be clicked on or otherwise selected in order to cause the message to be sent.

When a message is received, the email client software provides a receiving user with the ability to reply to the received message, for example by way of a "Reply" and/or "Reply All" button within the graphical user interface. Clicking on the "Reply" button sets up a new message, including the received message, for editing and sending back to the original sender of the received message. Clicking on the "Reply All" button also sets up a new message, also including the received message, for editing and sending back to the original sender and any other recipients of the original message. A reply that is sent including all previous message information is sometimes referred to as a "reply with history". The original sender, or any other recipient of a reply message, may then similarly generate another reply.

A series of received messages that are direct or indirect replies to an original "root" message may be referred to as a message "thread". The reply messages in a thread may be considered child messages under the original root message. In addition to the reply messages, a thread may or may not be considered to also include the original root message. In an email system, a thread may consist of a number of related received messages stored in a user's Inbox, or another mailbox structure provided by the email system.

Some existing email systems have attempted to display message threads in a user friendly way by using what are referred to as "gathered" threads views. For example, in one type of gathered threads view, received messages belonging to a thread are represented using a single message entry in the user's Inbox. However, not all email users have such a view available to them, or prefer such a view, and accordingly "non-gathered" views remain common.

A problem with existing email systems occurs when a user accesses different versions of a document attachment, as may occur when an attachment is modified within a message thread. Email threads are often used to share document attachments among multiple users, such as during a review process for a specification document. Such a process may involve several iterations in which the document being reviewed is sent back and forth with different modifications. In existing systems, when an Inbox or Folder view is used that doesn't gather a thread through a gathered threads view, it may be difficult to find the most recently sent or received message in the thread, and even more difficult to find the latest version of an attached document sent back and forth within the thread. For example, if a user simply opens an email message without knowing if that message is the last message in the thread, the user may not be able to easily determine whether the document attached to that message is the most recent version of the document with regard to modifications made within the thread. This situation relates to the fact that many existing email systems attach a document to a message by carrying the document within the message, and allow modifications to the document attachment within the message.

For these reasons and others, it would be desirable to have a new system for handling email messages that enables a user to open any message in an email message thread and conveniently obtain a most recent version of any document attached to the message. The system should be operable to provide a most recent version of an attached document regardless of which message within the tread that the user has opened, including when the opened message is not the most recent message in the thread. Moreover, the new system should enable the user to alternatively open the version of the document that was originally attached to the opened message, even if that version is not the most recent version of the document.

SUMMARY OF THE INVENTION

To address the above described and other shortcomings of previous systems, a method and system for providing version control for documents attached to electronic mail messages is disclosed. In the disclosed system, a user's personal document library is used to store documents attached to the email messages the user sends and/or receives. Each time an attached document is transmitted or received within a message thread, a different version of the document is created and stored in the personal document library. The multiple document versions created allow the disclosed system to provide the user with the options of opening the most recent version of an attached document and/or opening the version of the attached document that is associated with the specific opened message.

In one embodiment, an API (Application Programming Interface) provided by the personal document library enables the user to request the most recent version of a document, or another specific version of the document can be indicated for opening. The disclosed system may be embodied to represent an attached document within an email message by using a URL (Uniform Resource Locator) that is stored within the message, where the stored URL points to the version of the attached document stored in the personal document library for that message.

In the disclosed system, the user's client email application is provided with access to the user's personal document library. The personal document library may be stored locally within the user's client computer system, and/or replicated on a server computer system. In the case where the personal document library is replicated onto a server computer system, the user could employ an email client provided through a Web browser and still obtain the benefits of the system.

Thus there is disclosed a new system for handling email messages that enables a user to open any message in an email message thread and conveniently obtain a most recent version of any document attached to the message. The disclosed system is operable to provide a most recent version of an attached document regardless of which message within the tread that the user has opened, including when the opened message is not the most recent message in the thread. The disclosed system also enables the user to alternatively open the version of the document that was originally attached to the opened message, even if that version is not the most recent version of the document.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
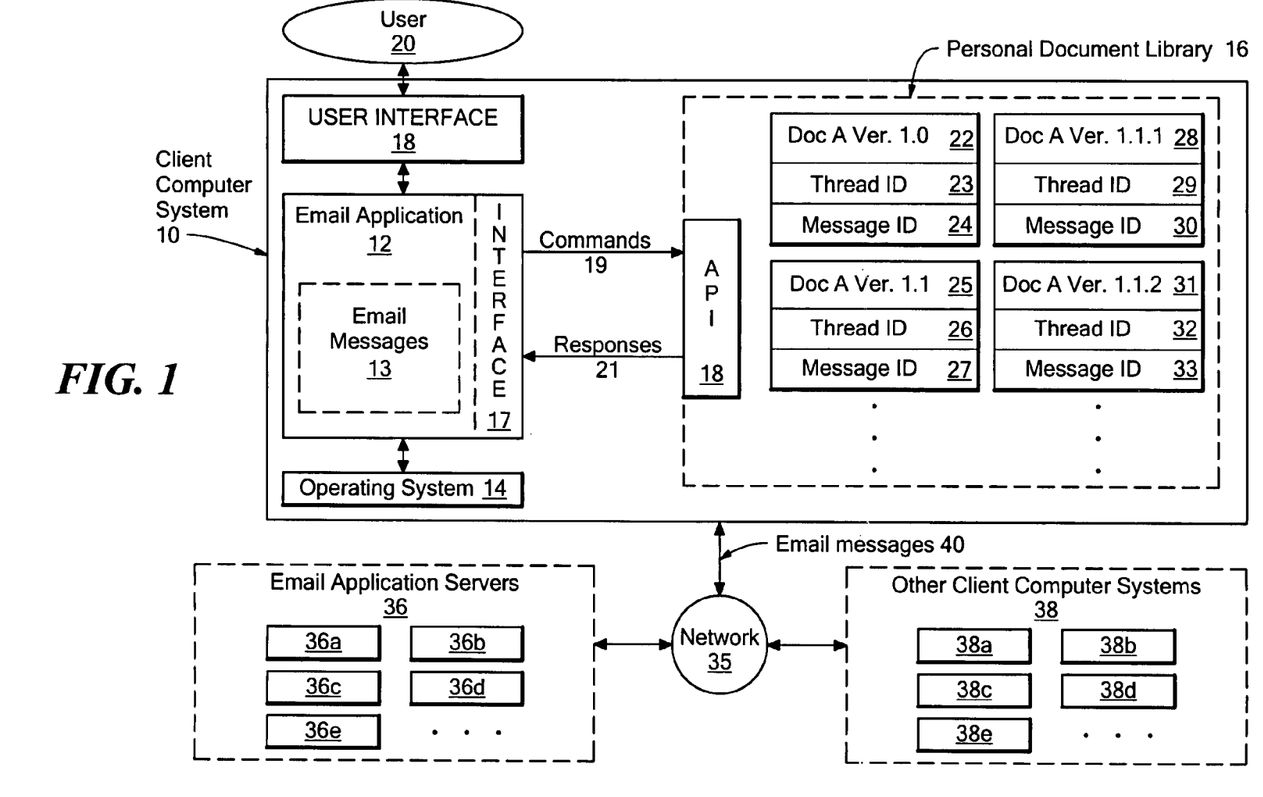
FIG. 1 is a block diagram showing hardware and software components providing an illustrative embodiment of the disclosed system.

As shown in FIG. 1, an illustrative embodiment of the disclosed system operates using a number of software components executing on a number of computer systems, shown for purposes of illustration as client computer system 10, other client computer systems 38, and email application server computer systems 36. Further for purposes of illustration, the other client computer systems 38 are shown including client computer systems 38a, 38b, 38c, 38d, 38e, etc., and email application server computer systems 36 are shown including server computer systems 36a, 36b, 36c, 36d, 36e, etc. The client computer system 10, other client computer systems 38, and email application server computer systems 36 may each, for example, include at least one processor, program storage, such as memory, for storing program code executable on the processor, and one or more input/output devices and/or interfaces, such as data communication and/or peripheral devices and/or interfaces. The client computer system 10, other client computer systems 38, and email application server computer systems 36 are communicably connected by a communication network 35, such as a Local Area Network (LAN), the Internet, or the like. The client computer system 10, other client computer systems 38, and email application server computer systems 36 may each further include appropriate operating system software, as illustrated in FIG. 1 by the operating system 14 in client computer system 10.

The email application program 12 executing on the client computer system 10 operates to send and receive email messages on behalf of the local user 20, and provides a graphical user interface, shown as the user interface 18, to the local user 20. The email application program 12 may, for example, be a client program that uses a messaging system based on a protocol such as the Simple Mail Transfer Protocol (SMTP) to send and receive email messages 40 to and from the other client computer systems 38, through the email application servers 36.

During operation of the email application 12, interface program logic 17 operates to store and retrieve documents that are attached to email messages 13 by using the personal document library 16. In this regard, the interface program logic 17 send commands 19 to the personal document library 16, through the application programming interface 18. The personal document library 16 processes the commands 19 and generates responses 21 to the interface program logic 17. The personal document library 16 is a document database or file system associated with the user 20, and supports storing and retrieving multiple versions of a document.

In one embodiment of the disclosed system, each document and/or version of a document stored in the personal document library 16 may be stored in association with a unique identifier of an email message thread, and/or in association with an identifier of a specific email message. In the illustrative personal document library 16 of FIG. 1, multiple versions of Document A are shown associated with corresponding message thread identifiers and message identifiers. For example, Document A Version 1.0 22 is shown associated with a message thread identifier 23 and a message identifier 24, Document A Version 1.1 25 is shown associated with a message thread identifier 26 and a message identifier 27, Document A Version 1.1.1 is shown associated with a message thread identifier 29 and a message identifier 30, and Document A Version 1.1.2 31 is shown associated with a message thread identifier 32 and a message identifier 33. In this way, each version of each document stored in the may be stored and retrieved in association with an email message thread and email message.

The personal document library 16 enables the email application program 12 to store a document attachment such that it can be retrieved based on the message to which it was attached. The personal document library 16 further enables the email application program 12 to determine a most recent version of a document with regard to a given message thread. For example, in one embodiment, the version of a document with the highest version number in a message thread might be considered to be the most recent version of the document in the thread.

Figure 2:
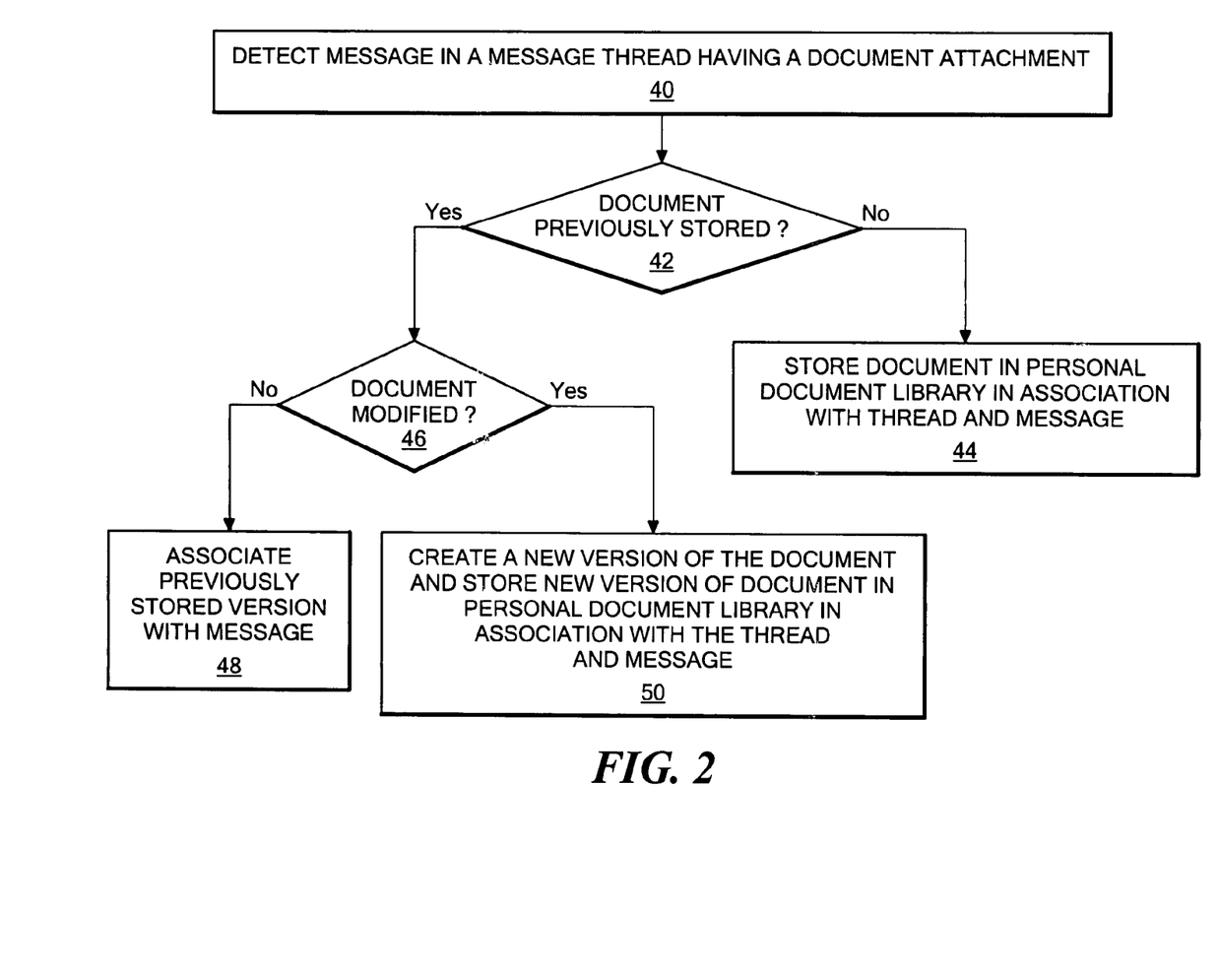
FIG. 2 is a flow chart showing steps performed in an illustrative embodiment of the disclosed system to process an attachment to an email message.

FIG. 2 is a flow chart showing steps performed in an illustrative embodiment of the disclosed system to process an attachment to an email message. The steps of FIG. 2 are performed automatically by the email application program. At step 40 the disclosed system detects an email message having at least one attached document. The message detected at step 40 may belong to a message thread including one or more existing messages, or may be the first message in a message thread to which one or more other messages are subsequently added. The message detected at step 40 may be detected as a result of a message operation resulting in a message being stored in a folder of messages, such as an Inbox, Sent Items, or other specific folder, or within another type of message storage construct. The message operation resulting in the detection at step 40 may include sending a message, receiving a message, or some other message operation.

At step 42, the disclosed system determines whether the document attached to the message detected at step 40 has been previously stored in the user's personal document library. The determination at step 40 may be based on the file name of the attached document, and/or other metadata associated with the attached document, together with the current contents of the personal document library. For example, if an attached document having a file name of Draft_Business_Plan.txt were processed at step 42, the email application program might issue a command to the personal document library to determine whether any versions of a document having that name have previously been stored in the personal document library. The determination at step 42 may further be message thread specific, in that a document may be considered to not have been previously stored in the personal document library if a version of the document has not been previously stored in association with the message thread to which the message detected at step 40 belongs.

If the disclosed system determines at step 42 that the document attached to the message detected at step 40 has not been previously stored in the personal document library, then at step 44 the document is stored in the personal document library in association with the message detected at step 40, and in association with the message thread to which the message detected at step 40 belongs. For example, the document may be stored in the personal document library together with a message identifier that identifies the message detected at step 40, as well as with a thread identifier identifying the message thread to which that message belongs. Otherwise, if the document attached to the message detected at step 40 has been previously stored in the personal document library, then at step 46 the disclosed system determines whether the document attached to the message detected at step 40 has been modified since it was last stored in the personal document library.

The determination at step 46 may be accomplished in a variety of specific ways. For example, in one embodiment, the email application program may include additional MIME (Multipurpose Internet Mail Extensions) headers within each email message having an attachment. The additional MIME headers contain metadata for the attached document that may be useful when determining whether the document has been modified since it was last stored. Such metadata contained in email messages having attached documents may, for example, include such information as an original version number of the document when it was first created by a local user and stored in the personal document library, a creation time and date, and/or a last modified time and date, or other information. Similar metadata may be stored in association with each of the document versions stored in the personal document library, and comparison of the metadata for a document attached to a received message to the metadata associated with a stored version of the document may enable a determination of whether the document attached to the received message has been modified since it was last stored in the personal document library.

If the disclosed system determines at step 46 that the document attached to the message detected at step 40 has not been modified since it was last stored in the personal document library, then there is no need to create a new version of the document. Accordingly, at step 48 the disclosed system associates the previously stored version of the document attached to the message detected at step 40 with the message detected at step 40, and with the message thread to which the message detected at step 40 belongs. If the disclosed system determines at step 46 that the document attached to the message detected at step 40 has been modified since it was last stored in the personal document library, then at step 50 a new version of the document is created in the personal document library, and used to store the modified document as attached to the message detected at step 40. The new version of the document is associated with the message detected at step 40 and with the message thread to which the message detected at step 40 belongs.

While the association of the stored document with the message and message thread performed in steps 44, 48 and 50 is described above as being based message thread and message identifiers stored in association with the document in the personal document library, the disclosed system is not limited to such an approach. Alternatively, the associations between documents stored in the personal document library and email messages to which they were attached, and to message threads to which such messages belong, may be maintained within the email application program. For example, on one such alternative embodiment, the email application program may operate by detaching the document from the email message to which it was attached, and store an pointer or other identifier of the document in the message that allows the document to be retrieved from the personal document library. Such a pointer may, for example, include a Uniform Resource Locator (URL), or the like, that points to the document as stored within the personal document library.

Figure 3:
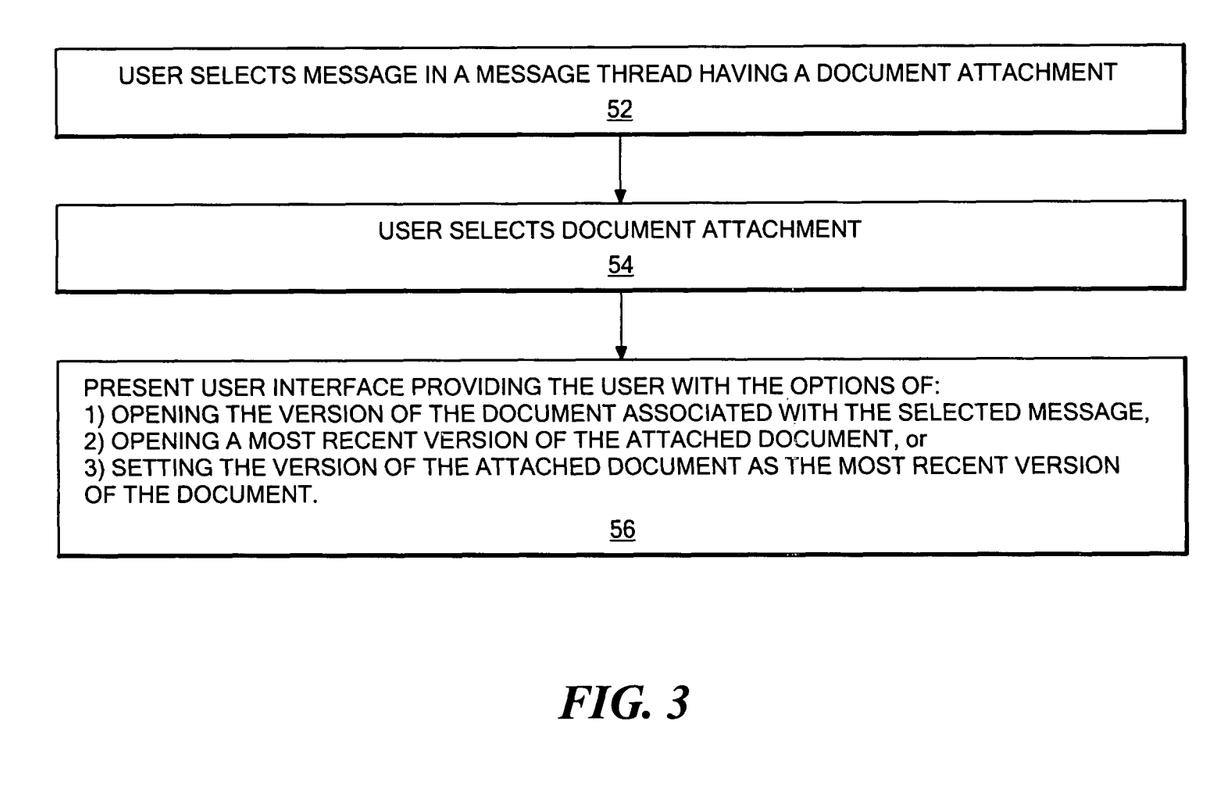
FIG. 3 is a flow chart showing steps performed in an illustrative embodiment of the disclosed system to process a user request to open an attachment to an email message.

FIG. 3 is a flow chart showing steps performed in an illustrative embodiment of the disclosed system to process a user request to open an attachment to an email message. At step 52, the disclosed system detects a user selecting a message having a document attachment. For example, the user may select a message by clicking on the message within a user interface provided by an email application program showing a number of email messages organized into one or more logical folders. The message selected at step 52 is associated with a thread of messages that includes child messages, such as replies or the like, with respect to an original root message of the thread. At step 54, the disclosed system detects the user selecting a document attachment to the message selected at step 52, for example by clicking on a visual representation of the attached document. In response to the user selection of the message at step 52 and/or the user selection of the document attachment at step 54, at step 56 the disclosed system provides a user interface that provides the user with multiple options with regard to opening the attached document. These options for opening the attached document include 1) opening a previously stored version of the document associated with the message selected at step 52, 2) opening a most recently stored version of the document, and 3) setting a previously stored version of the document associated with the message selected at step 52 to be the most recent version of the document. For example, a previously stored version of the document associated with the message selected at step 52 may be identified in the personal document library by using a unique message identifier for the message selected at step 52 to search the personal document library. A most recently stored version of the document may be identified in the personal document library by searching for versions of the document associated with the message thread containing the message detected at step 52, and then selecting the highest numbered version in the results. Finally, a previously stored version of the document associated with the message selected at step 52 may be set to be the most recent version of the document by searching the personal document library based on a unique identifier of the message detected at step 52, and then setting the version number of the matching document to a new highest version number of the document for the thread containing the message detected at step 52.

Figure 4:
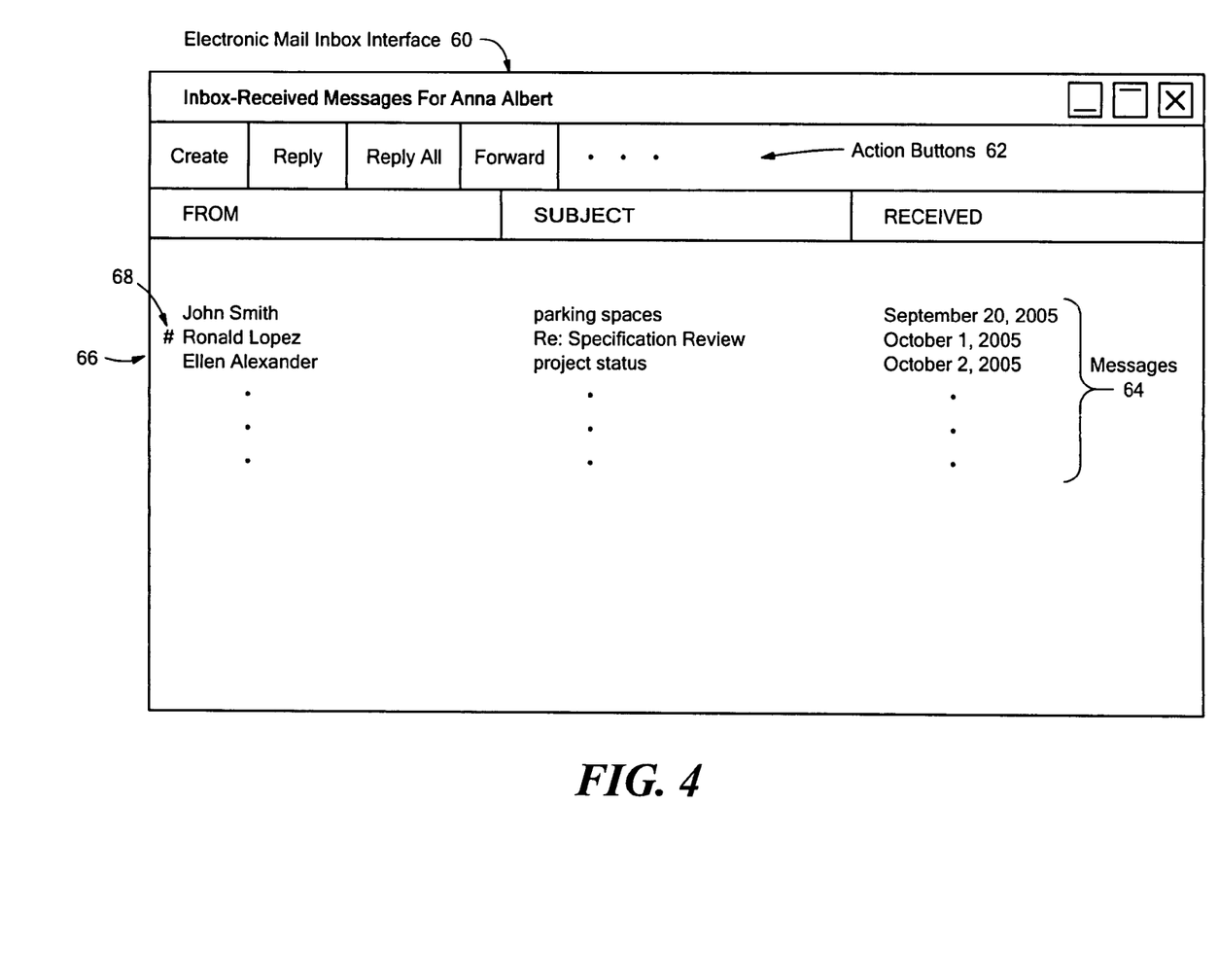
FIG. 4 is a simplified screen shot showing at least a portion of a received messages user interface provided by an illustrative embodiment of the disclosed system to allow a user to indicate an email message and/or attachment thereto.

FIG. 4 is a simplified screen shot showing at least a portion of a received messages user interface provided by an illustrative embodiment of the disclosed system to allow a user to indicate an email message and/or attachment thereto. As shown in FIG. 4, an electronic mail Inbox user interface 60 for a local user Anna Albert includes a number of action buttons 62 that provide corresponding functions. A list of messages 64 includes received messages currently stored within the Inbox of the user Anna Albert. In the example of FIG. 4, the messages 64 includes a received message list element 66 corresponding to a message received from a remote user Ronald Lopez, having a subject of "Re: Specification Review", and received on Oct. 1, 2005. In the example of FIG. 4, the message corresponding to the message list element 66 is a response to a previously transmitted message having a subject of "Specification Review", transmitted by the local user Anna Albert to the remote users Ronald Lopez and Bob Johnston.

The received message list element 66 includes an indication 68 that the message has one or more attachments. The list element 66 is a clickable region, in that when the user clicks on the list element 66, the disclosed system presents a message user interface presenting the contents of and other information regarding the corresponding email message. In one possible embodiment, the attachment indication 68 can also be clicked on to cause the disclosed system to provide an attached document open interface directly from the inbox interface 60. While the indication 68 in FIG. 4 is shown for purposes of illustration as a "#" symbol, those skilled in the art will recognize that various other specific indications may alternatively be used in a email system mailbox interface to indicate that a given message includes one or more attachments.

Figure 5:
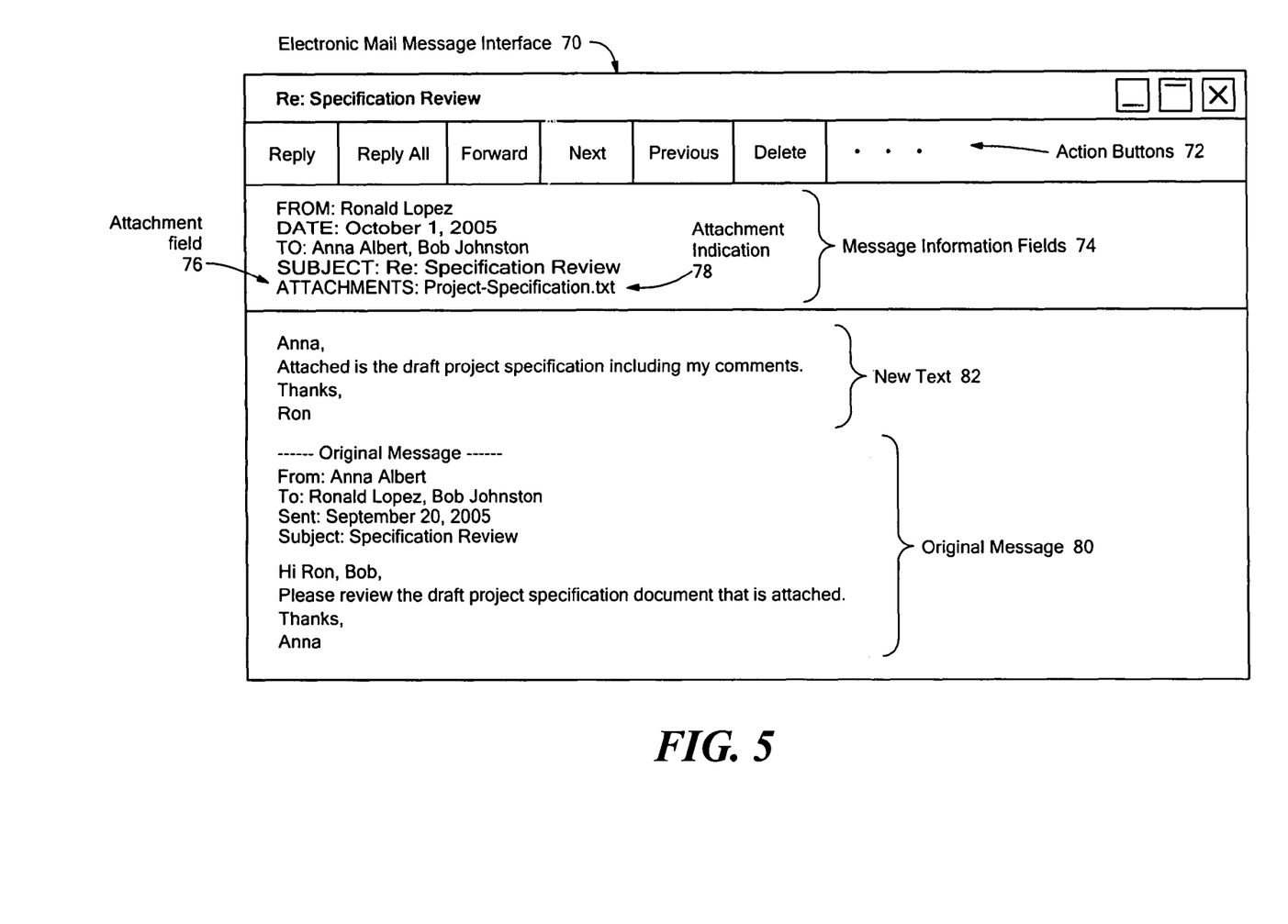
FIG. 5 is a simplified screen shot showing at least a portion of a message user interface provided by an illustrative embodiment of the disclosed system to allow a user to indicate an attachment to a message and request that the attachment be opened.

FIG. 5 is a simplified screen shot showing at least a portion of a message user interface provided by an illustrative embodiment of the disclosed system to allow a user to indicate an attachment to a message and request that the attachment be opened. An electronic mail message interface 70 is shown in FIG. 5, as may be provided by the disclosed system in response to a user clicking on the message list entry 66 shown in FIG. 4. The message interface 70 may include a number of action buttons 72, enabling a user to perform certain associated actions with regard to the corresponding email message represented by the message interface 70. A number of message information fields 74 display information about the corresponding message, such as the sender of the message, the date the message was received, the users to which the message was sent, the subject of the message, etc. An attachment field 76 displays the names of one or more documents attached to the message. In the illustrative example of FIG. 5, the attachment field 76 displays the document name "Project-Specification.txt", which is the name of a file attachment to the message. The document name "Project-Specification.txt" is an example of an attachment indication 76. Those skilled in the art will recognize that various other attachment indications may be provided in the alternative. The attachment indication 76 is clickable, such that when the user clicks on it, another user interface is displayed that provides the user with multiple options with regard to opening various versions of the document having the name "Project-Specification.txt".

The message interface 70 further displays the text of an original message 80, to which the received message represented by the message interface 70 of FIG. 5 is a response. The new text 82 is text that was entered by the user Ronald Lopez in response to the original message 80. The received message from Ronald Lopez that is represented by the message interface 70 in FIG. 5 may be considered a child message to the original message 80. Thus the received message from Ronald Lopez represented by the message interface 70 in FIG. 5 and the original message 80 to which it is a reply make up an example of at a portion of a message thread. Moreover, further for purposes of explanation, the attached document having the "Project-Specification.txt" is modified from when it was sent as an attachment to the original message 80. Accordingly, the disclosed system will have operated to store the modified "Project-Specification.txt" that was attached to the received message represented by the message interface 70 in FIG. 5 as a new version of that document when that received message was initially detected.

Figure 6:
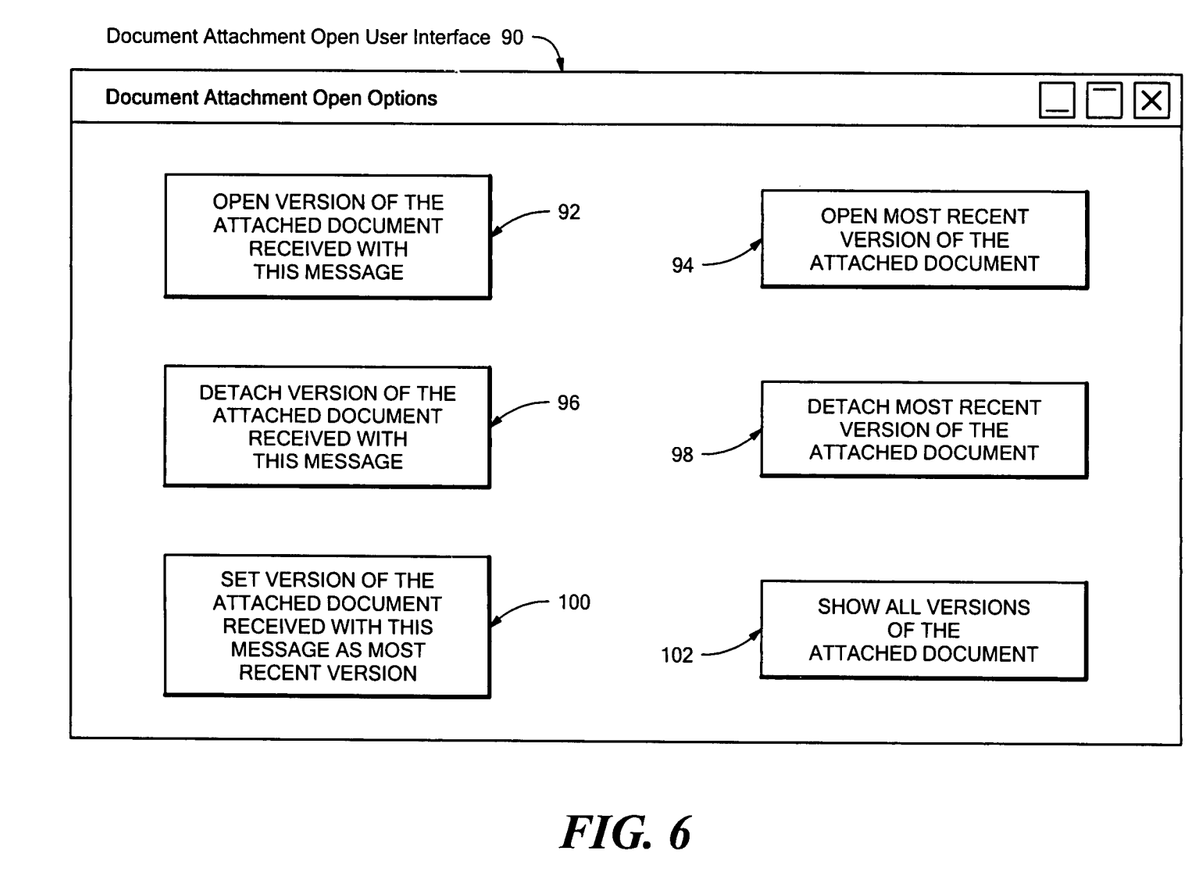
FIG. 6 is a simplified screen shot showing at least a portion of a document open user interface provided by an illustrative embodiment of the disclosed system to allow a user to indicate which version of an attached document is to be opened.

FIG. 6 is a simplified screen shot showing at least a portion of a document open user interface provided by an illustrative embodiment of the disclosed system to allow a user to indicate which version of an attached document is to be opened. As shown in FIG. 6, a document attachment open user interface 90 is provided in response to a user requesting that a document attached to an electronic mail message be opened. For example, the user interface 90 may be presented in response to a user clicking on or hovering the cursor over the attachment indication 78 of FIG. 5, or in an alternative embodiment in response to the user clicking on or hovering the cursor over the indication 68 of FIG. 4. The user interface 90 is shown including a number of button graphical objects that provide the user with multiple options with regard to opening a document attached to an electronic mail message. While the illustrative embodiment of FIG. 6 includes button graphical objects allowing the user to select among the options by clicking on the appropriate button, those skilled in the art will recognize that the present invention is not limited to such an embodiment. Alternatively, any appropriate user interface mechanism allowing for the simultaneous presentation of multiple alternative user options may be employed.

Such mechanisms include, but are not limited to, pull down menus, check boxes, radio buttons, and the like.

A first button 92 enables a user to open the version of the document that was received as an attachment to the current message. For example, the current message in the example of FIG. 6 is the message from Ronald Lopez represented by the message interface 70 of FIG. 5 and/or by the message list entry 66 of FIG. 5. The button 94 enables the user to open the most recent version of the document. For example, a most recent version of the attached document would be another modification to the attached document attached to a message received subsequent to and within the same message thread as the current message, and accordingly having been assigned a higher version number. The button 96 enables a user to detach the version of the attached document that was received with the current message. The button 98 enables the user to detach the most recent version of the document. The button 100 enables the user to set the version of the document attached to the current message as the most recent version of the document, for example by assigning a new highest version number to the version of the document attached to the current message. And the button 102 enables the user to access all versions of the attached document within the message thread, for example within a displayed list or other visual construct provided in a separate user interface window or the like.

In general, while the above description refers to embodiments of the disclosed system having specific arrangements of specific types of user interface components, such as buttons, fields, specific layouts, formats, etc., the present invention is not so limited. Accordingly, those skilled in the art will recognize that alternative embodiments may use various other specific types of user interface components, and/or various other arrangements of such components, in order to present information to and receive information from a user. Alternative embodiments may use any appropriate types of user interlace components that may be selectable by a user with a mouse user interface device, keyboard, or other equivalent devices, including but not limited to pull down menus, check boxes, and/or other types of user interface components.

Similarly, while for purposes of concise illustration FIGS. 3-6 show simplified and/or abstracted depictions of relevant portions of user interfaces provided by embodiments of the disclosed system, those skilled in the art will recognize that the present invention is not so limited. User interfaces in embodiments of the disclosed system may accordingly include more or fewer graphical components than shown in the examples of FIGS. 3-6, as may be appropriate for specific embodiments.

FIGS. 1-3 are block diagram and flowchart illustrations of methods, apparatus(es) and computer program products according to an embodiment of the invention. It will be understood that each block of FIGS. 1-3, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A computer-implemented method of providing version control for documents attached to electronic mail messages, comprising:

detecting a transmit message operation resulting in a transmitted electronic mail message being stored in a sent items folder of messages, said transmitted message having an attached document and belonging to a message thread;

determining, in response to said detecting of said transmit message operation resulting in said transmitted message being stored in said sent items folder of messages, whether a version of said attached document was previously stored in association with said message thread to which said transmitted message belongs in a personal document library of a local user;

in response to determining that said previous version of said attached document is stored in said personal document library in association with said message thread to which said transmitted message belongs, determining whether said attached document has been modified since said previous version of said attached document was previously stored in said personal document library in association with said message thread to which said transmitted message belongs; and in response to determining that said attached document has been modified since said version of said attached document was previously stored in said personal document library in association with said message thread to which said transmitted message belongs, creating a new version of said attached document by storing said attached document into said personal document library in association with said message thread to which said transmitted message belongs; and responsive to said local user selecting a user interface object indicating said attached document in an electronic mail message user interface enabling said local user to perform actions regarding said transmitted message, presenting a document open user interface including multiple document open options, wherein a first of said document open options enables said local user to open said new version of said attached document, and wherein a second of said document open options enables said local user to open a most recent version of said attached document contained within said message thread, wherein said most recent version of said document was previously received as an attachment to an electronic mail message in said message thread received subsequently to said transmitted message, and wherein said document open user interface further enables said local user to make said new version of said attached document said most recent version of said attached document in said message thread by assigning a new highest version number to said new version of said attached document.

2. The method of claim 1, further comprising storing a pointer to said new version of said attached document in said detected message.

3. A system including a non-transitory computer readable storage medium, said non-transitory computer readable storage medium having program code stored thereon for providing version control for documents attached to electronic mail messages, said program code comprising:

program code for detecting a transmit message operation resulting in a transmitted electronic mail message being stored in a sent items folder of messages, said transmitted message having an attached document and belonging to a message thread;

program code for determining, in response to said detecting of said transmit message operation resulting in said transmitted message being stored in said sent items folder of messages, whether a version of said attached document was previously stored in association with said message thread to which said transmitted message belongs in a personal document library of a local user;

program code for determining, in response to determining that said previous version of said attached document is stored in said personal document library in association with said message thread to which said transmitted message belongs, whether said attached document has been modified since said previous version of said attached document was previously stored in said personal document library in association with said message thread to which said transmitted message belongs;

program code for creating, in response to determining that said attached document has been modified since said version of said attached document was previously stored in said personal document library in association with said message thread to which said transmitted message belongs, a new version of said attached document by storing said attached document into said personal document library in association with said message thread to which said transmitted message belongs; and program code for, responsive to said local user selecting a user interface object indicating said attached document in an electronic mail message user interface enabling said local user to perform actions regarding said transmitted message, presenting a document open user interface including a multiple document open options, wherein a first of said document open options enables said local user to open said new version of said attached document, and wherein a second of said document open options enables said local user to open a most recent version of said attached document contained within said message thread, wherein said most recent version of said document was previously received as an attachment to an electronic mail message in said message thread received subsequently to said transmitted message, and wherein said document open user interface further enables said local user to make said new version of said attached document said most recent version of said attached document in said message thread by assigning a new highest version number to said new version of said attached document.

4. The system of claim 3, said program code further comprising program code for storing a pointer to said new version of said attached document in said detected message.

5. A computer program product including a non-transitory computer readable storage medium, said computer readable storage medium having program code stored thereon for providing version control for documents attached to electronic mail messages, said program code comprising:

program code for detecting a transmit message operation resulting in a transmitted electronic mail message being stored in a sent items folder of messages, said transmitted message having an attached document and belonging to a message thread;

program code for, in response to said detecting of said transmit message operation resulting in said transmitted message being stored in said sent items folder of messages, whether a version of said attached document was previously stored in association with said message thread to which said transmitted message belongs in a personal document library of a local user;

program code for determining, in response to determining that said previous version of said attached document is stored in said personal document library in association with said message thread to which said transmitted message belongs, whether said attached document has been modified since said previous version of said attached document was previously stored in said personal document library in association with said message thread to which said transmitted message belongs;

program code for creating, in response to determining that said attached document has been modified since said version of said attached document was previously stored in said personal document library in association with said message thread to which said transmitted message belongs, a new version of said attached document by storing said attached document into said personal document library in association with said message thread to which said transmitted message belongs; and program code for, responsive to said local user selecting a user interface object indicating said attached document in an electronic mail message user interface enabling said local user to perform actions regarding said transmitted message, presenting a document open user interface including a multiple document open options, wherein a first of said document open options enables said local user to open said new version of said attached document, and wherein a second of said document open options enables said local user to open a most recent version of said attached document contained within said message thread, wherein said most recent version of said document was previously received as an attachment to an electronic mail message in said message thread received subsequently to said transmitted message, and wherein said document open user interface further enables said local user to make said new version of said attached document said most recent version of said attached document in said message thread by assigning a new highest version number to said new version of said attached document.

\* \* \* \* \*